United States Patent
Au et al.

(10) Patent No.: US 10,193,777 B2
(45) Date of Patent: *Jan. 29, 2019

(54) WI-FI/BPL DUAL MODE REPEATERS FOR POWER LINE NETWORKS

(71) Applicant: AT&T Intellectual Property II, L.P., Atlanta, GA (US)

(72) Inventors: Alan K. Au, Basking Ridge, NJ (US); Farhad Barzegar, Branchburg, NJ (US); Edward J. Dolan, Bernardsville, NJ (US); Irwin Gerszberg, Kendall Park, NJ (US); Jeremiah A. Okoro, Langhorne, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/157,811

(22) Filed: May 18, 2016

(65) Prior Publication Data
US 2016/0261477 A1 Sep. 8, 2016

Related U.S. Application Data

(63) Continuation of application No. 14/295,698, filed on Jun. 4, 2014, now abandoned, which is a continuation
(Continued)

(51) Int. Cl.
*H04L 12/26* (2006.01)
*H04B 1/74* (2006.01)
(Continued)

(52) U.S. Cl.
CPC ............ *H04L 43/0811* (2013.01); *H04B 1/74* (2013.01); *H04B 3/46* (2013.01); *H04B 3/54* (2013.01); *H04B 3/58* (2013.01); *H04B 17/309* (2015.01); *H04L 43/0823* (2013.01); *H04L 43/0847* (2013.01); *H04B 2203/5441* (2013.01)

(58) Field of Classification Search
CPC ......... H04L 12/5601; H04L 2012/5601; H04L 49/256
See application file for complete search history.

(56) References Cited

U.S. PATENT DOCUMENTS

| | | |
|---|---|---|
| 3,838,412 A | 9/1974 | Jones |
| 5,406,643 A | 4/1995 | Burke et al. |

(Continued)

*Primary Examiner* — Hassan A Phillips
*Assistant Examiner* — Prenell Jones
(74) *Attorney, Agent, or Firm* — Chiesa Shahinian & Giantomasi PC

(57) ABSTRACT

A method and apparatus for maintaining network connectivity over power lines is disclosed. Such network connectivity is maintained even if various customers are covered by different power line networks or if one or more power lines in a network are unavailable to transmit data. More particularly, in order to bridge a gap in a power line network, one or more messages are extracted from a first node in a power line network and are then transmitted to a second node via free space transmission, illustratively wireless radio frequency (RF) transmission conforming to one or more of the 802.11a, b or g standards. When those messages are received at the second node, the message is injected back into the power line on the other side of a gap in power line coverage. This method of transmission backup will continue until power line connectivity is restore upon which the preferred method will be selected and used.

20 Claims, 4 Drawing Sheets

Related U.S. Application Data of application No. 12/942,161, filed on Nov. 9, 2010, now Pat. No. 8,780,901, which is a continuation of application No. 11/016,140, filed on Dec. 17, 2004, now Pat. No. 7,852,837.

(60) Provisional application No. 60/532,773, filed on Dec. 24, 2003.

(51) Int. Cl.
*H04B 3/54* (2006.01)
*H04B 17/309* (2015.01)
*H04B 3/46* (2015.01)
*H04B 3/58* (2006.01)

(56) References Cited

U.S. PATENT DOCUMENTS

| | | |
|---|---|---|
| 5,608,608 A | 3/1997 | Flint et al. |
| 6,028,513 A | 2/2000 | Addy |
| 6,078,661 A | 6/2000 | Arnett et al. |
| 6,128,512 A | 10/2000 | Trompower et al. |
| 6,611,537 B1 | 8/2003 | Edens et al. |
| 6,735,630 B1 | 5/2004 | Gelvin et al. |
| 6,998,962 B2 | 2/2006 | Cope et al. |
| 7,006,768 B1 | 2/2006 | Franklin |
| 7,020,701 B1 | 3/2006 | Gelvin et al. |
| 7,024,222 B2 | 4/2006 | Gorsuch |
| 7,213,254 B2 | 5/2007 | Koplar et al. |
| 7,224,272 B2 | 5/2007 | White et al. |
| 7,852,837 B1 | 12/2010 | Au et al. |
| 2001/0010490 A1 | 8/2001 | Bellin |
| 2002/0087556 A1 | 7/2002 | Hansmann et al. |
| 2002/0191594 A1 | 12/2002 | Itoh et al. |
| 2003/0083024 A1 | 5/2003 | Richenstein et al. |
| 2004/0003073 A1 | 1/2004 | Krzyzanowski et al. |
| 2004/0120273 A1 | 6/2004 | Border et al. |
| 2004/0174251 A1 | 9/2004 | Fisher et al. |
| 2005/0168326 A1 | 8/2005 | White et al. |
| 2005/0273282 A1 | 12/2005 | Mollenkopf |
| 2006/0026017 A1 | 2/2006 | Walker |
| 2006/0250980 A1 | 11/2006 | Pereira et al. |
| 2008/0272934 A1 | 11/2008 | Wang et al. |

WI-FI/BPL DUAL MODE REPEATERS FOR POWER LINE NETWORKS

This application is a continuation of U.S. application Ser. No. 14/295,698, filed Jun. 4, 2014, which is a continuation of U.S. patent application Ser. No. 12/942,161, filed Nov. 9, 2010, issued as U.S. Pat. No. 8,780,901, which is a continuation of U.S. patent application Ser. No. 11/016,140, filed Dec. 17, 2004, issued as U.S. Pat. No. 7,852,837, which claims the benefit of U.S. Provisional Application No. 60/532,773, filed Dec. 24, 2003, all of which are incorporated herein by reference in their entirety.

BACKGROUND OF THE INVENTION

This application relates generally to data transmission and, more particularly, to data transmission over power lines.

Telecommunications and other network service providers require physical access to end destinations, such as homes and businesses, in order to deliver their services. Various methods of delivering services to an end destination are typically available. For example, local phone companies have extensive networks of network delivery equipment directly to homes and businesses for delivering telephony and networking services (e.g., Internet access). Additionally, cable television providers have a similarly extensive network for delivering television content, network access and other services to homes and businesses.

Therefore, traditional service providers have a readily available delivery method of offering and providing services to an end user. However, if a third-party provider wishes to establish a new service or compete with the more traditional service providers, that third-party must typically pay a fee to lease the distribution network of the traditional service provider. This lease fee is typically high and, as a result, it is frequently the case that a third-party provider cannot offer as competitive a price for its products as can the network-owning traditional service providers. Therefore, alternative methods of delivering services and data to a home have been investigated.

One such attempt involves the use of power lines to offer communications services, such as data networking, to an end user. Initially, such power line communication systems were limited to relatively low data rates, typically less than 500 kbps. These low data rates are generally useful for applications such as remote control of various switches connected to the power line system. More recently, developments have been made in the area of broadband power line communication systems, also known as power line telecommunications (PLT) systems or broadband power line (BPL) systems. These systems are capable of transmitting data at significantly higher data rages than previous systems. For example, BPL systems can transmit data at rates of 4-24 Mbps.

Typically, power line networking systems have components that operate in conjunction with the power grid infrastructure to deliver high-bandwidth network services to an end user. While existing power line systems are capable of transmitting data at the rates described above, they were not initially designed for data transmission. Instead, different power networks were designed to service specific geographic areas with only limited connectivity between the networks. Additionally, unlike many data transmission networks, power line networks were only designed with limited, if any, redundancy for the paths from one point to another. Therefore, in many instances, it would be difficult to provide power line data network service to customers on different power networks. Additionally, if a power line failed or was unavailable for any reason (e.g., for maintenance), network destinations served by that power line would lose network connectivity.

SUMMARY OF THE INVENTION

The present inventors have essentially solved the above problem. Specifically, the present inventors have invented a method and apparatus for maintaining network connectivity over power lines, even if various customers are covered by different power line networks or if one or more power lines in a network are unavailable to transmit data. More particularly, in order to bridge a gap in a power line network, one or more messages are extracted from a first node in a power line network and are then transmitted to a second node via free space transmission, illustratively wireless radio frequency (RF) transmission conforming to one or more of the 802.11a, b or g standards. When those messages are received at the second node, the message is injected back into the power line on the other side of a gap in power line coverage. Thus, when an interruption occurs, for example due to a fallen power line or maintenance to a line, network data is transmitted from one wireless access point to another, thus allowing for continued network coverage.

DETAILED DESCRIPTION OF THE INVENTION

Figure 1:
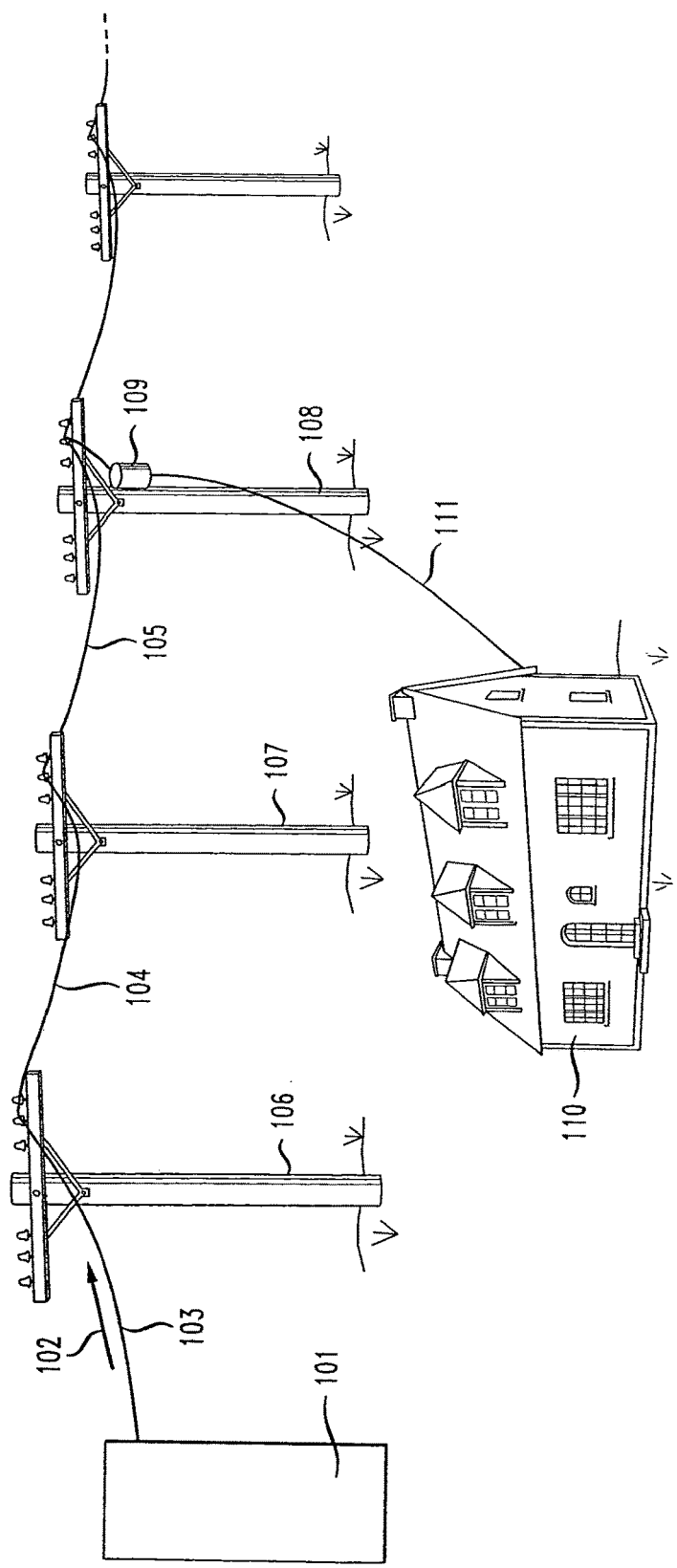
FIG. 1 shows a typical prior art power line network for transmitting and delivering electricity.

FIG. 1 shows a portion of a power network such as that commonly used to deliver electricity to homes and businesses. In that figure, substation 101 receives electricity from one or more power plants via transmission equipment and high voltage transmission lines. As is well known, transformers in substation 101 step down the power from transmission level voltages (extremely high voltages) to distribution voltages (typically less than 35,000 volts). Buses at the substation then split the distribution power off in multiple directions, such as direction 102 in FIG. 1. Electricity conducting wires, such as illustrative wires 103, 104 and 105, are suspended above the ground by poles, such as poles 106, 107 and 108. The electricity is stepped down once again to an illustrative 120/240 Volts by transformer 109 and is then delivered to an end destination, such has house 110, via tap wire 111. One skilled in the art will recognize that, while an overhead power line system is shown in FIG. 1, the following description and the principles of the present invention are equally applicable to underground power distribution systems.

Figure 2:
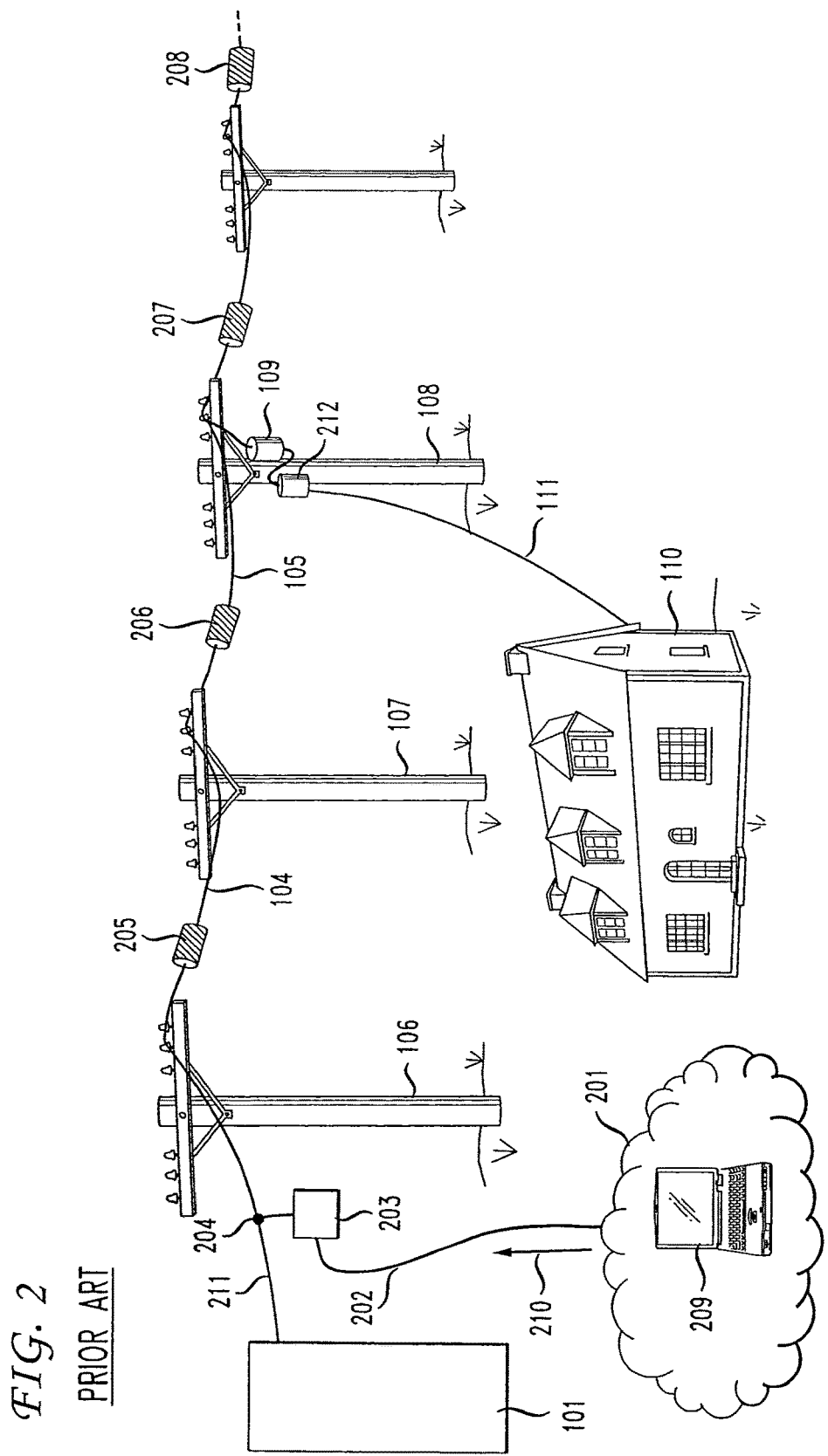
FIG. 2 shows a prior art power line data network whereby data is transmitted across the power line network for delivery to an end destination.

As discussed above, in addition to using power networks to deliver electricity, the cables/wires that transmit the electricity may also be used for communications/data networking. FIG. 2 shows an illustrative power line network useful for such networking purposes. In that figure, as described above, electricity is delivered via substation 101, and wires 104, 105 and 211 to pole 108, where the voltage of the electricity is stepped down using transformer 109 for delivery over line 111 to house 110. In order to use the power line network to deliver, for example, data, it is necessary to inject the data into the power line network, amplify and condition the signal as necessary, and to extract the data from the network at or near an end destination. These functions are accomplished, respectively, by hardware components referred to herein as injectors (for injecting the signal into the power line network), repeaters (for amplifying and conditioning the signal as necessary during transmission), and extractors (for extracting the signal from the power line network at or near a desired destination). Referring to FIG. 2 once again, network 201 is, illustratively an Internet Protocol (IP) network such as the Internet. IP networks, such as network 201, are used to transmit information from one IP address to another IP address by encapsulating that information into IP packets that each have, for example, addressing information in a header of each packet. This header is used by switches/routers in the IP network to route the packets to the intended destination and are, therefore, referred to as IP-switched networks. Such IP networks are well-known in the art and, therefore, will not be further described herein.

As shown in FIG. 2, in an illustrative use of a power line network for data networking, user 209 in data network 201 generates a message having a destination of an end user in house 110. This message is transmitted in direction 210 along transmission path 202 which is, illustratively, a fiber optic data transmission line, to injection node 203, also referred to interchangeably herein as a power line networking node. Injection node 203 is used to receive data from data network 201 (which is, for example, a fiber ring, DS3 or DS1 network) and to initiate transmission at connection 204 of that data over a medium voltage power line, such as power line 211. The data signal is transmitted over the power lines that are suspended by poles 106, 107 and 108 to illustrative destination house 110. When the data signal reaches pole 108, attached to house 110, an extractor node 212 is used to extract the signal from the power line and to forward it over the lower voltage power distribution line 111 to house 110. One skilled in the art will recognize that delivery of data to house 110 may also be accomplished by other means, such as via wireless data transmission.

If the end extraction node and end destination are relatively close geographically to the injection node of the data, then the data can be transmitted directly from the injector to the extractor 212 with no intervening amplification or signal conditioning. However, in order to reach more distant destinations, one or more repeaters, such as repeaters 205, 206, 207 and 208 are typically used to condition the signal periodically as it is transmitted over the power line network. These repeaters may be installed on either a power line pole or, alternatively, directly on the power line itself. If installed on a pole, repeaters may be powered using a secondary 120V power source. If installed directly onto the actual power line (e.g., the medium voltage power line), the repeaters may be powered inductively by the line itself or, alternatively, power may be provided by a pole mounted transformer. Once installed, in addition to amplifying the signal, repeaters 205-208 function to reduce noise in the signal, route the packet and retransmit the packet along the medium voltage power line to its destination. Spacing of the repeaters 205-208 is dependent upon the desired bandwidth, the application, and the level of noise on the line. Typically, such repeaters are spaced between 500 and 2000 feet apart.

Thus, according to the foregoing description, message traffic may be transmitted to an end user via a power line network. However, a problem arises whenever a portion of the power line network is unavailable. For example, the customers of a network service provider may be served by different, segregated power systems. Using traditional power line networking techniques, such a configuration would require the network service provider to interface directly with multiple power systems at potentially geographically diverse locations. Also, within each power line network, the power lines may become unavailable due to scheduled or unscheduled maintenance or due to interruptions resulting from such conditions as high wind or falling trees that cause the power lines to fall. If the power line in question is carrying network traffic, any such unavailability may result in an interruption in network service to the intended destination of the traffic. In traditional data networks, redundancy is built in to the system so as to permit rerouting of the messages to enable delivery of the messages even in the case a network component, such as a transmission line, becomes unavailable. However, while power line networks allow rerouting of power to a certain level, this redundancy does not approach the flexibility of a data network.

The present inventors have substantially solved the aforementioned problems. Specifically, the present inventors have invented a method and apparatus where multiple power line networks or separated segments of the same power line network may be connected together. More particularly, one or more wireless access points/bridges, for example conforming to one or more of the 802.11a, 802.11b, or 802.11g standards, are used to connect separate power line networks or to bridge any gaps that may occur in the power line. Data is then extracted from one power line network or one segment of a power line network and is then wirelessly transmitted to a second power line network or, alternatively, to another segment of the same power line network. In this way, network data is transmitted from one wireless access point/bridge to another, and network connectivity and coverage is enhanced or maintained.

Figure 3:
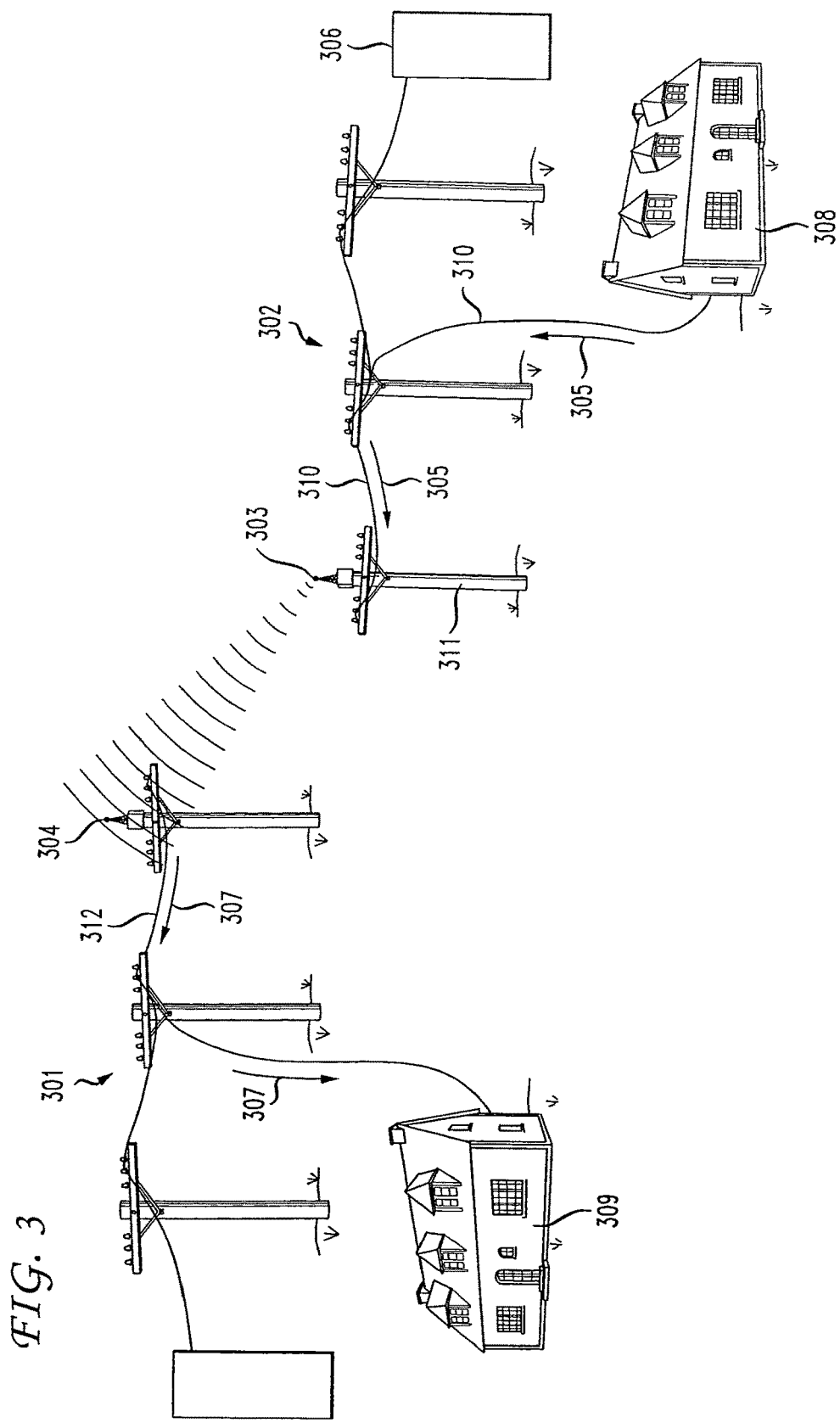
FIG. 3 how an illustrative radio transceiver may be used to provide network coverage to customers on different power line networks.

FIG. 3 shows one embodiment in accordance with the principles of the present invention whereby two networks 301 and 302 are connected together using wireless access points/bridges. Thus, when a user in illustrative house 308 sends a network message to a second user in house 309, the message will travel in direction 305 along line 310 to pole 311. The network data is then extracted from power line 310 by access point 303 or associated networking equipment and is then packaged using well known methods for transmission over the air. Access point 303 then transmits the message wirelessly in a signal 306 conforming, illustratively, to one of the 802.11 standards to access point 304 in power line network 301. Access point 304 receives the message and reinserts the message onto line 312 in network 301. The message travels in direction 307 along the power line network, as discussed above, to the destination user in house 309. In this way, a network service provider may serve customers even if they use different power line networks or if they are temporarily separated from their servicing network due to power network reconfiguration such as maintenance periods and/or disruptions due to unforeseen conditions.

Figure 4:
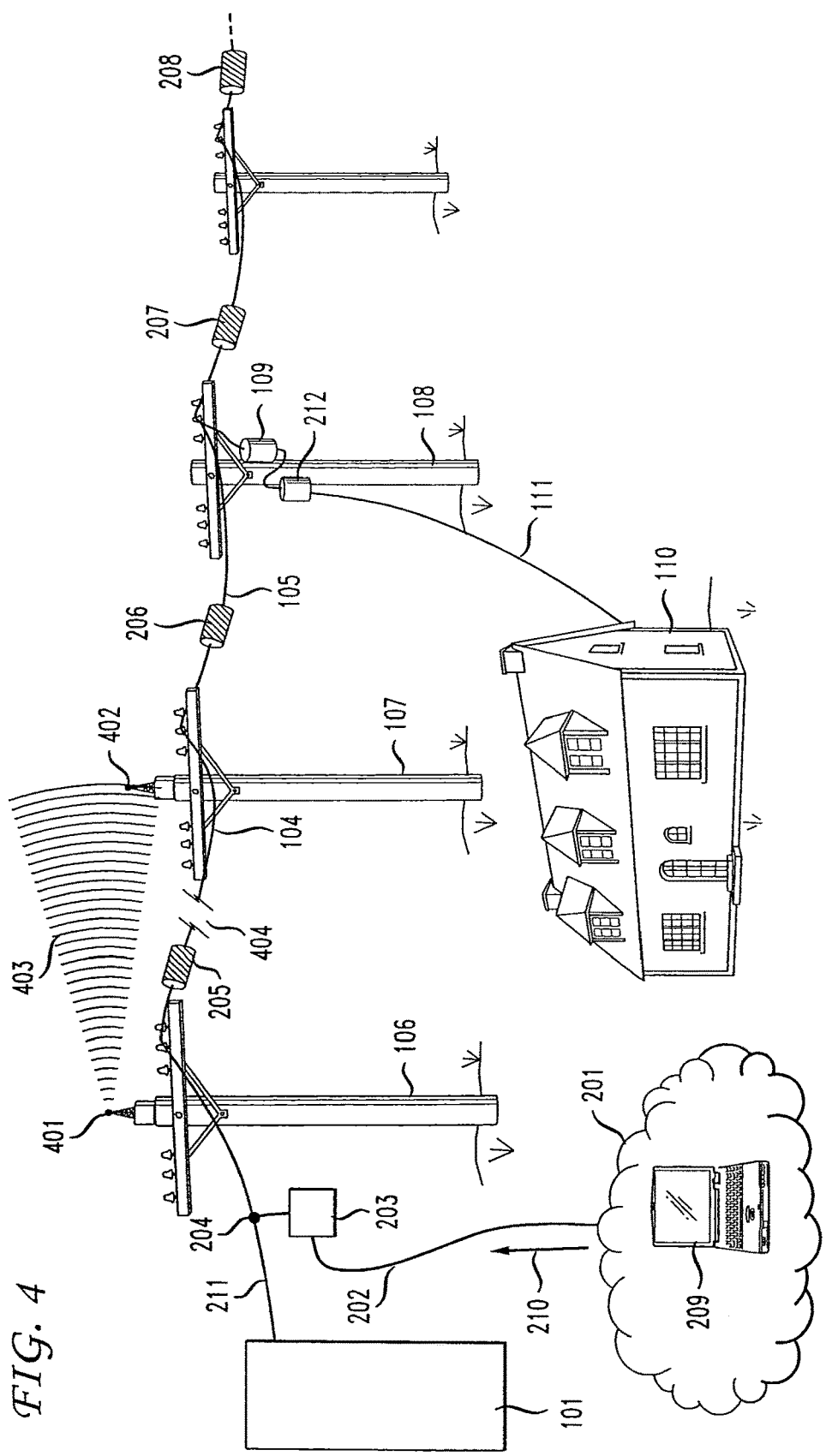
FIG. 4 shows how an illustrative radio transceiver may be used to bridge a gap between two power line networks, such as the network of FIG. 2 in accordance with the principles of the present invention.

FIG. 4 shows another embodiment in accordance with the principles of the present invention whereby network connectivity is maintained in the event a gap in the power line network occurs, for example due to the previously discussed reasons. One skilled in the art will realize that, if a power line or other power network component becomes unavailable, data delivery will likely be interrupted. Since reliability of a data network is a primary factor to consider when subscribing to a data networking service, such interruptions may significantly limit the desirability of using such a network. Thus, referring to FIG. 4, in order to maintain connectivity when a gap in a power line, such as gap 404 in line 104, occurs, radio transceivers, such as wireless access points 401 and 402 are used to bridge the gap 404 automatically. Wireless access points 401 and 402 may, illustratively, conform to one or more 802.11 standards (e.g., 802.11a, 802.11b, 802.11g). Such wireless access points/bridges and communications between such wireless nodes is well known in the art and will therefore not be further described herein. One skilled in the art will recognize that wireless access points such as described herein may also include routers to switch messages between various destinations in the network. As used herein, the terms wireless access points, wireless routers, and wireless access points/routers are used interchangeably and are intended to encompass all implementations of wireless access points and/or routers in power line Referring once again to FIG. 4, in power line network implementations of such wireless routers/access points and as discussed above, the data message from user 209 in network 201 will once again travel across network connection 202 to injector 203. This message will then be injected into power line 211 and be transmitted along that line to pole 106. When break 404 in the power line is detected, the data will be extracted from the line and will be transmitted over the air by wireless router/access point 401 on pole 106 along path 403 to wireless router/access point 402 on pole 107. The data message will then be re-injected into the power line at pole 107 and continue along power line 105 to repeater 206 on pole 108. As described above, extractor 212 will extract the data from the power line for transmission to house 110 via line 111. Thus, gaps in the power line network may be adequately bridged to provide network access even in the event an interruption in the power line network occurs.

Many different implementations of wireless transmission of power line network data are possible. For example, while shown in FIG. 3 and FIG. 4 as being mounted on the power line poles, wireless routers/access points may be mounted on a stand-alone structure. Mounting a wireless device on each power pole or a stand alone structure associated with each power line pole would permit near instantaneous bridging of nearly any interruption. However, in many cases the access points may actually be used as part of the delivery method of data to the customer's house and hence their additional cost can be easily justified. Additionally, as opposed to using either the power line network or the wireless network, as described above, it may be desirable to use the power line and the wireless networks cooperatively. For example, in order to ensure a desired level of service is preserved for each user, the wireless network may be used as an alternative to the wired network even when there is no interruption to the wired network. In such a system, for example, a method of least cost may be employed for determining which network connection to use. Illustratively, an algorithm running on, for example, a computer at any network node could constantly verify the transmission characteristics of the two parallel systems and would select the one providing the fastest throughput and/or the most robust packet transmission (e.g., which system results in fewer data transmission errors). One skilled in the art will recognize in light of the foregoing that many different criteria may be used to select which type of connection (wired or wireless) to use.

One skilled in the art will also recognize that, although radio frequency (RF) communications are used as an illustrative example herein, it is possible to use other forms of wireless communications, such as free space optical communications. Such optical communications are well-known and use optical transmitters and receivers to transmit an optical beam carrying data from one point to another. One skilled in the art will further recognize that many other variations are possible and that any or all of the embodiments described herein above may be combined in order to create an implementation suitable to meet the needs of a particular network in order to add flexibility to network design and to reduce implementation and operations costs.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmitting information, comprising:
   receiving a message, at a node of a power line network, from a first power line segment of the power line network;
   detecting, at the node, an interruption in the power line network;
   in response to detecting the interruption in the power line network, comparing, using a processor at the node, a transmission characteristic of a wireless transmission of the message and a transmission characteristic of a wired transmission of the message; and
   transmitting the message, from the node, via one of the wireless transmission or the wired transmission, to a second power line segment of the power line network, based on the comparing of the transmission characteristic of the wireless transmission of the message and the transmission characteristic of the wired transmission of the message.

2. The method as recited in claim 1, wherein comparing the transmission characteristic of the wireless transmission of the message and the transmission characteristic of the wired transmission of the message comprises:
   determining whether the wireless transmission of the message or the wired transmission of the message provides higher data throughput.

3. The method as recited in claim 1, wherein comparing the transmission characteristic of the wireless transmission of the message and the transmission characteristic of the wired transmission of the message comprises:
   comparing data transmission errors via the wireless transmission of the message and data transmission errors via the wired transmission of the message.

4. The method as recited in claim 1, wherein the interruption in the power line network comprises:
   an unavailability of a portion of the power line network.

5. The method as recited in claim 4, wherein the unavailability of the portion of the power line network comprises:

a break in a power line in the portion of the power line network.

6. The method as recited in claim 1, wherein transmitting the message comprises:
   transmitting the message via the wireless transmission to the second power line segment using a wireless device based on the comparing.

7. The method as recited in claim 1, wherein transmitting the message comprises:
   transmitting the message via the wired transmission to the second power line segment based on the comparing.

8. The method as recited in claim 1, wherein the first power line segment comprises a first radio transceiver and the second power line segment comprises a second radio transceiver.

9. A node in a power line network, comprising:
   a processor; and
   a memory to store computer program instructions, the computer program instructions when executed on the processor cause the processor to perform operations comprising:
      receiving a message from a first power line segment of the power line network;
      detecting an interruption in the power line network;
      in response to detecting the interruption in the power line network, comparing a transmission characteristic of a wireless transmission of the message and a transmission characteristic of a wired transmission of the message; and
      transmitting the message via one of the wireless transmission or the wired transmission, to a second power line segment of the power line network, based on the comparing of the transmission characteristic of the wireless transmission of the message and the transmission characteristic of the wired transmission of the message.

10. The node of the power line network as recited in claim 9, wherein the transmission characteristic is data throughput.

11. The node of the power line network as recited in claim 9, wherein the transmission characteristic is data transmission errors.

12. The node of the power line network as recited in claim 9, wherein the interruption in the power line network comprises:
   an unavailability of a portion of the power line network.

13. The node of the power line network as recited in claim 12, wherein the unavailability of the portion of the power line network comprises:
   a break in a power line in the portion of the power line network.

14. The node of the power line network as recited in claim 9, wherein transmitting the message comprises:
   transmitting the message via the wireless transmission to the second power line segment based on the comparing.

15. A computer readable storage device storing computer program instructions, which, when executed on a processor of a node of a power line network, cause the processor to perform operations comprising:
   receiving a message from a first power line segment of the power line network;
   detecting an interruption in the power line network;
   in response to detecting the interruption in the power line network, comparing a transmission characteristic of a wireless transmission of the message and a transmission characteristic of a wired transmission of the message; and
   transmitting the message via one of the wireless transmission or the wired transmission, to a second power line segment of the power line network, based on the comparing of the transmission characteristic of the wireless transmission of the message and the transmission characteristic of the wired transmission of the message.

16. The computer readable storage device as recited in claim 15, wherein the transmission characteristic is data throughput.

17. The computer readable storage device as recited in claim 15, wherein the transmission characteristic is data transmission errors.

18. The computer readable storage device as recited in claim 15, wherein the interruption in the power line network comprises:
   an unavailability of a portion of the power line network.

19. The computer readable storage device as recited in claim 18, wherein the unavailability of the portion of the power line network comprises:
   a break in a power line in the portion of the power line network.

20. The computer readable storage device as recited in claim 15, wherein transmitting the message comprises:
   transmitting the message via the wired transmission to the second power line segment based on the comparing.

* * * * *